United States Patent Office 2,726,934
Patented Dec. 13, 1955

2,726,934

HYDROMETALLURGICAL METHOD OF EXTRACTING METAL VALUES

Frank Arthur Forward, Vancouver, British Columbia, and Vladimir Nicholas Mackiw, Ottawa, Ontario, Canada, assignors to Sherritt Gordon Mines Limited, Toronto, Ontario, Canada, a company of Ontario, Canada No Drawing. Application September 21, 1951,
Serial No. 247,752

10 Claims. (Cl. 23—199)

This invention relates to a hydrometallurgical method of extracting metal values from starting materials such as ores, concentrates, and metallurgical intermediates and residues, and is particularly directed to providing a method of leaching such materials for the extraction therefrom of metal values such as nickel, copper and cobalt.

Pyrometallurgical methods of extracting metal values from ores, concentrates, metallurgical intermediates such as mattes, speiss, slimes, and residues, are well known and widely used. Such methods have the important disadvantages of high capital and operating costs and very frequently it is not possible or it is not economically practical to recover valuable by-products of the material being treated. Hydrometallurgical methods of extracting the metal values of minerals, such as ores and concentrates, matte, speiss, secondary metals and the like have been and are being closely investigated for the possible substitution of such methods for the more costly pyrometallurgical methods.

It is known that metallic nickel, copper and cobalt are soluble under oxidizing conditions in ammonia-ammonium carbonate solutions. This method has the disadvantage that the metal values in the starting material must be in reduced metallic condition necessitating in the treatment of sulphide material, preliminary pyrometallurgical oxidizing and reducing roasting operations which involve costly capital and operating costs. Also, nickel, copper and cobalt are soluble only to a limited extent in carbonate solutions, for example, of the order of about 16 grams per litre.

Co-pending application No. 58,644, filed November 6, 1948, in the name of Frank A. Forward, now Patent No. 2,576,314, issued November 27, 1951, discloses a method for extracting the metal values from nickeliferous sulphide material by leaching the nickeliferous sulphides, which may contain other metal values such as, for example, copper and cobalt, with strong aqueous ammonia substantially free from ammonium carbonate. The starting material, which contains sulphide sulphur, and the strong aqueous ammonia are charged into a reaction zone wherein they are actively agitated and an oxidizing gas, such as oxygen, oxygen enriched air or compressed air, is fed into the reaction zone during the course of the leaching operation which is conducted, preferably, under superatmospheric pressure and at elevated temperature. During the course of the leaching operation, the metal sulphides are converted to complex soluble amines which are dissolved in the leach solution. Metal extraction efficiencies of the order of from 90% to 95% of the metal values contained in the starting material are obtained with low capital and operating costs.

We have found in the operation of the method disclosed in co-pending application No. 58,644, now Patent No. 2,576,314, that if there is not sufficient oxidized or oxidizable soluble sulphur present in the starting material, such as in the treatment of a matte in which a large part of the original sulphur has been removed in an earlier smelting operation, or in the treatment of metals such as secondary metals which contain very little, if any, sulphur, the extent to which the metals of interest are soluble in the strong aqueous ammonia leach solution is limited by the amount of oxidizable or oxidized sulphur present which is soluble in the leach solution. Thus, when it is desired to leach with strong aqueous ammonia starting material containing metal values such as, for example, one or more of the metals nickel, copper and cobalt which contains as little as 1% to 2% sulphur whereas from 30% to 35% sulphur is necessary to provide complete and efficient leaching conditions, it is necessary to supply sulphur in an oxidized or oxidizable soluble form to the starting material or in the leach solution in amount sufficient to make up for the sulphur deficiency in the starting material.

We have found further that a metal or a metal sulphide of which the metal of interest forms an amine sulphate complex which is soluble in the leach solution can be dissolved by oxidation in a solution containing ammonia and an ammonium salt, such as ammonium sulphate or ammonium sulphamate.

The minimum amount of the oxidized or oxidizable sulphur required to effect complete solubility of the amines of the metal or metals of interest is found to be stoichiometric equivalent of the metal or metals to be dissolved. The minimum volume of aqueous leach solution is determined by the solubility of the salt in the solution which, in turn, is determined by the character and the amount of the sulphate or sulphamate anions present, by the amount of the ammonia present, by the character of the metal or metals to be dissolved and by the temperature at which the leaching operation is conducted.

We have found that there must be sufficient ammonia present in the leach solution to form amines of each of the metals present which are soluble in the leach solution in the presence of all the other metals of interest. When an ammonium salt such as ammonium sulphate or ammonium sulphamate is employed to provide the anions, the ammonia released during the course of the reaction will provide an important part of the total ammonia required. Thus, it is preferred to employ an ammonium salt such as ammonium sulphate or ammonium sulphamate to provide the anions necessary for the dissolution of the metal ammines.

It has been found further that the sulphur deficiency in the starting material can be satisfied by employing unsaturated sulphur compounds such as ammonium sulphide, hydrogen sulphide, sulphur dioxide, ammonium sulphite, ammonium thiosulphate, polythionates and the like which, in the course of the leaching operation, convert to ammonium sulphate or ammonium sulphamate.

The following examples illustrate the operation of the method in the treatment of various types of starting materials. In each instance, the starting material is deficient in oxidized or oxidizable sulphur which is soluble in the leach solution to the extent that there is not sufficient sulphur present in the starting material to effect complete solubility of the amines of the metal or metals of interest to be dissolved in the leach solution.

EXAMPLE 1

A matte produced by preliminary smelting operations and containing about 66 parts nickel plus copper plus cobalt, about 8.3 parts iron and about 25 parts sulphur was leached with 1000 parts of a solution containing about 10% ammonium sulphate, $(NH_4)_2SO_4$, and about 8% ammonia, $NH_3$. The theoretical minimum amount of oxidized or oxidizable sulphur required to effect complete solubility of the nickel, copper and cobalt amines produced by leaching this matte was of the order of 40 parts and it was necessary to satisfy the sulphur requirement and provide sufficient excess oxidized or oxidizable soluble sulphur to ensure complete solubility of the metal amines by the addition, in this instance, of ammonium sulphate to the aqueous ammonia to form the leach solution. The mixture of finely pulverized matte, of the order of about 100% minus 200 mesh standard Tyler screen, was actively agitated in a reaction vessel, such as an autoclave, at a pressure of about 30 pounds per square inch and at a temperature of about 175° F. for a period of about three hours, an oxidizing gas such as oxygen, oxygen enriched air, or compressed air, being fed into the reaction vessel during the leaching operation. At the end of the leaching period, it was found that about 99% of the nickel, copper, cobalt and sulphur had been dissolved in the leach solution which contained about 34 grams per litre nickel, 19 grams per litre copper, about 106 grams per litre ammonia (total) and 43 grams per litre total sulphur. In this particular example, the sulphur in the leach solution was about 50% in excess of the stoichiometric equivalent of the metals to be dissolved and the ammonia present was sufficient to form tetramine complexes.

Further experiments under comparable conditions in which a more highly concentrated ammonia-ammonium sulphate leach solution was employed and in which the ammonia content of the leach solution was as high as 150 grams per litre, total sulphur was as high as 100 grams per litre and with copper plus nickel plus cobalt from about 40 to 70 grams per litre produced similar results.

EXAMPLE 2

The same starting material was employed and the leaching operation was conducted under the same conditions as set out in Example 1 above with the difference that the oxidized and oxidizable sulphur present in the mixture charged into the reaction vessel constituted only 80% of the stoichiometric equivalent of the minimum amount required to effect complete solubility of the metals of interest and the ammonia was provided in considerable excess of that required to form the tetramines of the metals. The leaching operation was effective for extracting only 80% of the nickel values and 90% of the copper values originally contained in the starting material. Due to the deficiency of the sulphur, the nickel and copper could not be dissolved completely in the leach solution despite the fact that a small amount of these metals normally dissolve in the complete absence of sulphur as a result of the solubility of the hydroxides in strong ammonia solutions. It is found that the leaching operation proceeds satisfactorily only if there is present in the leach solution sulphate or sulphamate anions in at least the stoichiometric equivalent of the metals to be dissolved.

EXAMPLE 3

The sulphur required to effect complete solubility of the metal amines produced by leaching materials containing metals of interest which are deficient in sulphur may be supplied by treating the leaching solution either prior to or during the leaching operation with an unsaturated sulphur compound which when reacted with ammonia and oxygen forms a compound of the group comprising at least one of the compounds ammonium sulphate and ammonium sulphamate. Such sulphur compounds include but are not limited to sulphur dioxide, hydrogen sulphide, ammonium sulphide and like oxidizable sulphur compounds.

This procedure has an important advantage in treating starting materials containing metals such as copper, nickel and/or cobalt in which it is desired to produce a leach solution containing, in addition to the metal values, unsaturated sulphur compounds such as polythionates other than dithionates, and thiosulphate. Copper can be separated substantially completely as copper sulphide from such a solution by boiling the solution for a short period of time as described in detail in the co-pending application of Vladimir N. Mackiw, Serial No. 206,612, filed January 18, 1951. The operation of the method, therefore, in which an unsaturated sulphur compound is selected to supply the oxidizable sulphur necessary to effect complete solubility of the metal amines is capable of two modifications. If copper separation from the leach solution by boiling the solution after the leaching operation is not contemplated, the minimum amount of the unsaturated sulphur compound, such as sulphur dioxide, required to be added prior to or during the leaching operation is the stoichiometric equivalent for the formation of the amine sulphates or sulphamates of the metals of interest such as, for example, copper, nickel and cobalt. If the copper is to be separated by polythionate and/or thiosulphate decomposition effected by boiling the leach solution following the leaching operation, the minimum amount of sulphur dioxide, or the equivalent amount of sulphur contained in hydrogen sulphide or ammonium sulphide or other unsaturated sulphur compound must be sufficient to provide the polythionates which, on decomposition in the boiling operation, provide the sulphide ions for copper sulphide, $Cu_2S$, precipitation, providing that the total sulphur anions is at least equivalent to the stoichiometric equivalent for all the metals to be dissolved.

The operation of this latter modification is illustrated by the following data:

*1st stage*

| | |
|---|---|
| Temperature | 145–180° F. |
| Pressure | 20–150 p. s. i. g. (air). |
| Leach solution: | |
| Ni | 40–50 g. p. l. |
| Cu | 15–25 g. p. l. |
| $S-S_xO_6$ | 15–25 g. p. l. |
| $NH_3$ total | 80–150 g. p. l. |
| S total | 35–70 g. p. l. |
| Extraction | Ni—95, Cu—70, Co—95. |

*2nd stage*

Temperature and pressure as above.

| | |
|---|---|
| Leach solution: | |
| Ni | 5–10 g. p. l. |
| Cu | 30–60 g. p. l. |
| S total | 35–70 g. p. l. |
| Combined extractions | Ni—99, Cu—99, Co—99. |

EXAMPLE 4

The method of the present invention can be employed also to separate impurities from impure nickel metal. For example, nickel powder containing from about 0.5% to 2% sulphur, 0.2% to 1.0% cobalt, 0.1% silicon and about 1.0% iron was treated to remove the impurities and to produce a sulphur-free, cobalt-free, silicon-free, iron-free nickel metal.

The impure nickel powder, in the amount of about 45 grams was added to a litre of solution containing about 200 grams per litre ammonium sulphate and 10 grams per litre ammonia. The nickel was reacted for thirty minutes in a pressure vessel, such as an autoclave, at a temperature of about 220° F. at a pressure of about 50 pounds per square inch, an oxidizing gas such as oxygen, oxygen enriched air, or compressed air, being fed into the reaction vessel during the course of the leaching operation. At the end of the leaching period, 100% of the nickel, sulphur and cobalt had dissolved, leaving ferric hydroxide and silica in insoluble form. The suspended impurities were separated from the solution by filtration and the purified nickel solution was then subjected to a hydrogen reduction treatment during which, in the first stage, cobalt-free nickel was precipitated, and in the second stage, cobalt was recovered. The effluent solution from the reduction stage having a composition substantially identical with the leach solution employed to dissolve the original impure nickel powder, was recycled to the leaching stage and was employed therein to dissolve a second lot of nickel powder. In operating the method continuously, a small amount of the leach solution can be withdrawn continuously for treatment to remove the small amount of ammonium sulphate produced by oxidation and dissolution of the sulphur in the impure nickel powder and thus maintain the desired ammonium sulphate-ammonia ratio in the leach solution. In the example described above, the amount of ammonium sulphate in the solution, about 200 grams per litre, is approximately 100% in excess of the stoichiometric amount required for reaction with the nickel and cobalt amines in the solution.

EXAMPLE 5

The method was also employed with important advantages in the treatment of nickel oxide ores and concentrates. The metal values of interest in such ores and concentrates were first reduced to metallic form, such as by a reducing roasting operation, and any reduced iron present was re-oxidized by any one of several known methods to a form in which it was insoluble in the leach solution. The reduced material in finely pulverulent form, of the order of 100% minus 200 mesh standard Tyler screen, was added to an ammonia-ammonium sulphate solution containing from about 5% to about 25% ammonium sulphate and from about 1% to about 6% ammonia. The mixture was charged into a reaction vessel, such as an autoclave, wherein it was actively agitated under a pressure of the order of about 30 pounds per square inch at a temperature within the range of from about 70° F. to about 220° F. for about four hours, an oxidizing gas such as oxygen, oxygen enriched air, or compressed air being fed into the reaction vessel during the leaching operation. At the end of the leaching operation about 95% of the nickel values originally contained in the starting material was dissolved in the leach solution which was filtered to separate the insoluble residue. The solution containing the nickel values was then subjected to a hydrogen reduction treatment by which pure nickel was precipitated in the first stage and the cobalt was precipitated in the second stage. The barren solution, after nickel and cobalt removal, was returned and re-employed in the leaching stage of the method.

The method possesses a number of important advantages in extracting the metal values, particularly nickel, copper and cobalt, from starting materials containing such metal values which are deficient in sulphur. The metal amine sulphates or sulphamates formed by the union of the metal amines with the sulphate or sulphamate ions, provided or produced in the leaching operation, are highly soluble in the leach solution, the reactions proceeding rapidly and producing metal and sulphur extraction efficiencies approaching 100%. For example, the solubility of nickel in such solutions is as high as from 80 to 100 grams per litre as compared with the maximum solubility of about 16 grams per litre in ammonia-ammonium carbonate solutions. The method involves relatively low capital and operating costs as compared with the capital and operating costs of pyrometallurgical methods of the prior art, and, also, may be employed to recover, in addition to the metals of interest, valuable by-products which heretofore either could not be recovered economically or, alternatively, were lost in the treatment of the materials.

It will be understood, of course, that modifications may be made in the operation of the method described hereinabove without departing from the scope of the invention defined by the appended claims.

What we desire to protect by Letters Patent of the United States is:

1. The method of extracting metal values from metal bearing oxidizable material containing values of at least one of the metals nickel, copper and cobalt, said material containing less than the stoichiometric equivalent of sulphur to the metal values to be extracted, said method comprising the step of actively agitating said material in an aqueous ammonia solution substantially free from ammonium carbonate and containing free ammonia in amount at least sufficient to form amines of each metal present in said material to be dissolved in the solution and an added ammonium salt selected from the group consisting of ammonium sulphate and ammonium sulphamate, said ammonium salt being present in amount sufficient to provide sulphur atoms in at least the stoichiometric equivalent of the metal values to be dissolved, conducting the operation in a reaction zone maintained at elevated temperature and under superatmospheric pressure, and feeding an oxygen bearing, oxidizing gas into the reaction zone during the operation.

2. The method of extracting metal values from oxidizable metal bearing material containing values of at least one of the metals nickel, copper and cobalt, said material containing less than the stoichiometric equivalent of sulphur to the metal values to be extracted, said method comprising the step of dispersing said material in finely divided form in an aqueous ammonia solution substantially free from ammonium carbonate and containing free ammonia in amount at least sufficient to form amines of each metal present in said material to be dissolved in the solution and an added ammonium salt selected from the group consisting of ammonium sulphate and ammonium sulphamate, said ammonium salt being present in amount sufficient to provide sulphur atoms in at least the stoichiometric equivalent of the metal values to be dissolved, conducting the operation in a reaction zone maintained at elevated temperature and under superatmospheric pressure, actively agitating the mixture, and feeding an oxygen bearing, oxidizing gas into the reaction zone.

3. The method of extracting metal values from oxidizable metal bearing material containing value of at least one of the metals nickel, copper and cobalt, said material containing less than the stoichiometric equivalent of sulphur to the metal values to be extracted, said method comprising the step of actively agitating said material in an aqueous ammonia solution substantially free from ammonium carbonate and containing free ammonia in amount at least sufficient to form amines of each metal present in said material to be dissolved in the solution and an added ammonium salt selected from the group consisting of ammonium sulphate and ammonium sulphamate, said ammonium salt being present in amount sufficient to provide sulphur atoms in at least the stoichiometric equivalent of the metal values to be dissolved, conducting the operating in a reaction zone maintained at a temperature above about 70° F. and under a pressure above about 30 pounds per square inch, and feeding an oxygen bearing, oxidizing gas into the reaction zone during the operation.

4. The method of extracting metal values from oxidizable metal bearing material containing values of at least one of the metals nickel, copper and cobalt, said material containing less than the stoichiometric equivalent of sulphur to the metal values to be extracted, said method comprising the step of dispersing said material in finely divided form in an aqueous ammonia solution substantially free from ammonium carbonate and containing free ammonia in amount at least sufficient to form amines of each metal present in said material to be dissolved in the solution and an added ammonium salt selected from the group consisting of ammonium sulphate and ammonium sulphamate, said ammonium salt being present in amount sufficient to provide sulphur atoms in at least the stoichiometric equivalent of the metal values to be dissolved, conducting the operation at a temperature above about 70° F. and under a pressure above about 30 pounds per square inch, and feeding an oxygen bearing, oxidizing gas into the reaction zone during the operation.

5. The method of extracting metal values from oxidizable metal bearing material containing values of at least one of the metals nickel, copper and cobalt, said material containing less than the stoichiometric equivalent of sulphur to the metal values to be extracted, said method comprising the steps of actively agitating said material in an aqueous ammonia solution substantially free from ammonium carbonate and containing free ammonia in amount at least sufficient to form amines of each metal present in said material to be dissolved in the solution and an added ammonium salt selected from the group consisting of ammonium sulphate and ammonium sulphamate, said ammonium salt being present in amount sufficient to provide sulphur atoms in at least the stoichiometric equivalent of the metal values to be dissolved, conducting the operation in a reaction zone maintained at elevated temperature and under superatmospheric pressure, feeding an oxygen bearing, oxidizing gas into the reaction zone during the leaching operation, separating undissolved residue from the leach solution, separating dissolved metal values from the leach solution, and re-cycling leach solution from the last mentioned step to the leaching step of the method.

6. The method of extracting metal values from oxidizable metal bearing material containing values of at least one of the metals nickel, coper and cobalt, said material containing less than the stoichiometric equivalent of sulphur to the metal values to be extracted, said method comprising the steps of actively agitating said material in an aqueous ammonia solution containing free ammonia in amount at least sufficient to form amines of each metal present in said material to be dissolved in the solution and an added ammonium salt selected from the group consisting of ammonium sulphate and ammonium sulphamate, said ammonium salt being present in amount sufficient to provide sulphur atoms in at least the stoichiometric equivalent of the metal values to be dissolved, conducting the reaction in a reaction zone maintained at elevated temperature and under superatmospheric pressure, feeding an oxygen bearing oxidizing gas into the reaction zone during the leaching operation, the dissolution of the metal values in the leach solution being effected essentially by the reaction between the metal values, aqueous ammonia substantially free from ammonium carbonate, ammonium salt selected from the group consisting of ammonium sulphate and ammonium sulphamate and the oxygen bearing oxidizing gas.

7. The method of extracting metal values from oxidizable metal bearing material containing values of at least one of the metals nickel, copper and cobalt, said material containing less than the stoichiometric equivalent of sulphur to the metal values to be extracted, said method comprising actively agitating said material in an aqueous ammonia solution containing free ammonia in amount at least sufficient to form amines of each metal present in said material to be dissolved in the solution, an added sulphur compound adapted to form in the solution under oxidizing conditions an ammonium salt of the group consisting of ammonium sulphate and ammonium sulphamate in amount sufficient to provide sulphur atoms in at least the stoichiometric equivalent of the metal values ot be dissolved, conducting the reaction in a reaction zone maintained at elevated temperature and under superatmospheric pressure, feeding an oxygen bearing, oxidizing gas into the reaction zone during the leaching operation, the dissolution of the metal values in the leach solution being effected essentially by the reaction betwen the metal values, aqueous ammonia substantially free from ammonium carbonate, ammonium salt selected from the group consisting of ammonium sulphate and ammonium sulphamate and the oxygen bearing, oxidizing gas.

8. The method according to claim 7 in which the metal values are in the form of mineral sulphides.

9. The method according to claim 7 in which the metal values to be extracted from the oxidizable material are in reduced metallic form.

10. The method according to claim 7 in which the metal values are in the form of sulphides from which a portion of the sulphur has been extracted.

References Cited in the file of this patent

UNITED STATES PATENTS

| | | |
|---|---|---|
| 2,176,775 | Sweet et al. | Oct. 17, 1939 |
| 2,520,958 | Poole et al. | Sept. 5, 1950 |
| 2,576,314 | Forward | Nov. 27, 1951 |

OTHER REFERENCES

The Canadian Mining and Metallurgical Bulletin, Nov. 434, June of 1948, page 354.